United States Patent [19]

Tsuchiya et al.

[11] 3,825,678

[45] July 23, 1974

[54] PHOTOGRAPHIC IMAGE PICK-UP CODING SYSTEM

[75] Inventors: Hiroyoshi Tsuchiya; Yukifumi Tsuda; Heijiro Hayami; Hiroaki Kotera, all of Osaka, Japan

[73] Assignee: Matsushita Electric Industrial Company, Limited, Osaka, Japan

[22] Filed: Oct. 5, 1972

[21] Appl. No.: 295,555

[30] Foreign Application Priority Data

Oct. 7, 1971 Japan .............................. 46-79203

[52] U.S. Cl......... 178/7.1, 178/DIG. 3, 178/DIG. 28

[51] Int. Cl........................... H04n 5/36, H04n 7/12

[58] Field of Search......... 178/DIG. 28, DIG. 3, 7.1, 178/15.55

[56] References Cited

UNITED STATES PATENTS 2,909,601 10/1969 Fleckenstein et al.......... 178/DIG. 3

3,646,257 2/1972 Epstein et al................. 178/DIG. 3

*Primary Examiner*—Robert L. Richardson

*Assistant Examiner*—Mitchell Saffian

[57] ABSTRACT

A photographic image pick-up and coding system of run-length type, comprising a pulse generator for producing clock pulse, horizontal synchronizing pulse and horizontal pulse signals, a facsimile signal generator for repeatedly producing a facsimile signal representing photographic information on a horizontal line until energized by a coding completion signal, a run-length gate for passing therethrough the clock pulse signal during a time duration when a run-length gate pulse signal lasts, a run-length controller for producing the run-length gate signal by using the facsimile, clock pulse and blanking pulse signals, a coder for coding the clock pulse signal passed through the run-length gate, and a modulator for modulating the coded clock pulse signal by a suitable carrier wave.

1 Claim, 36 Drawing Figures

Fig. 1-a
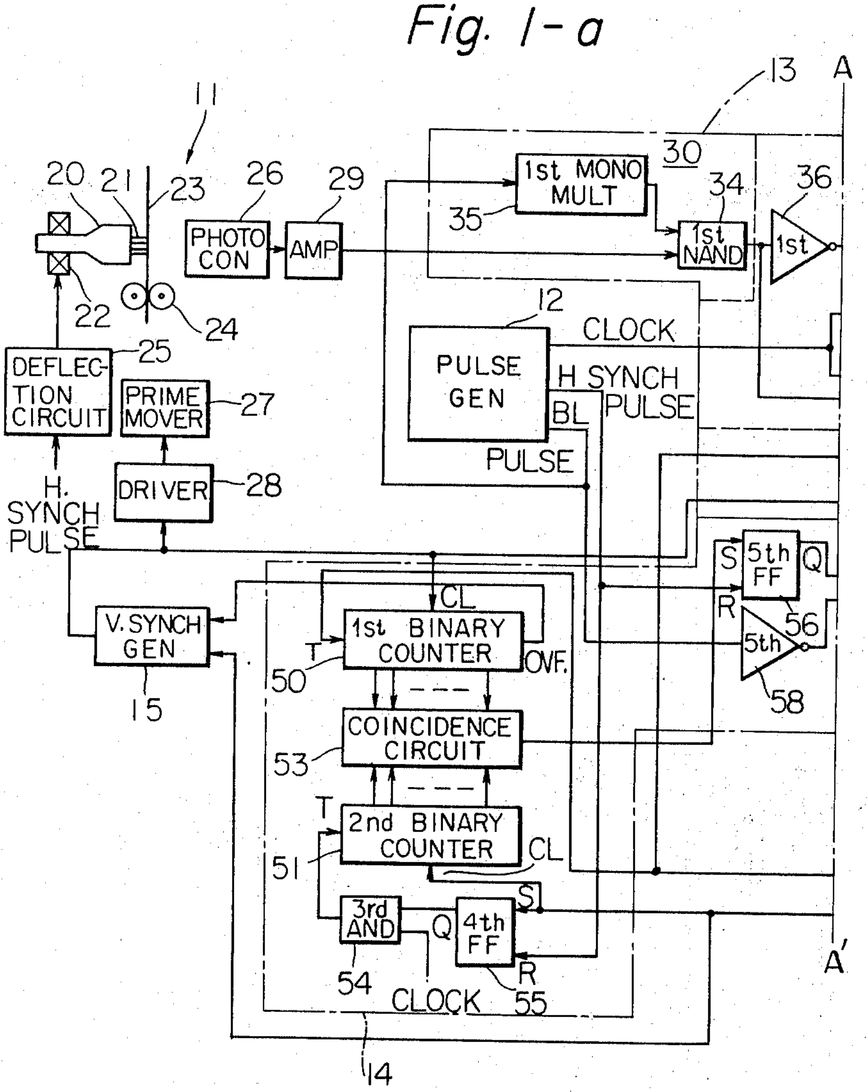
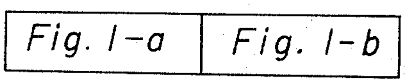

Fig. 1-b
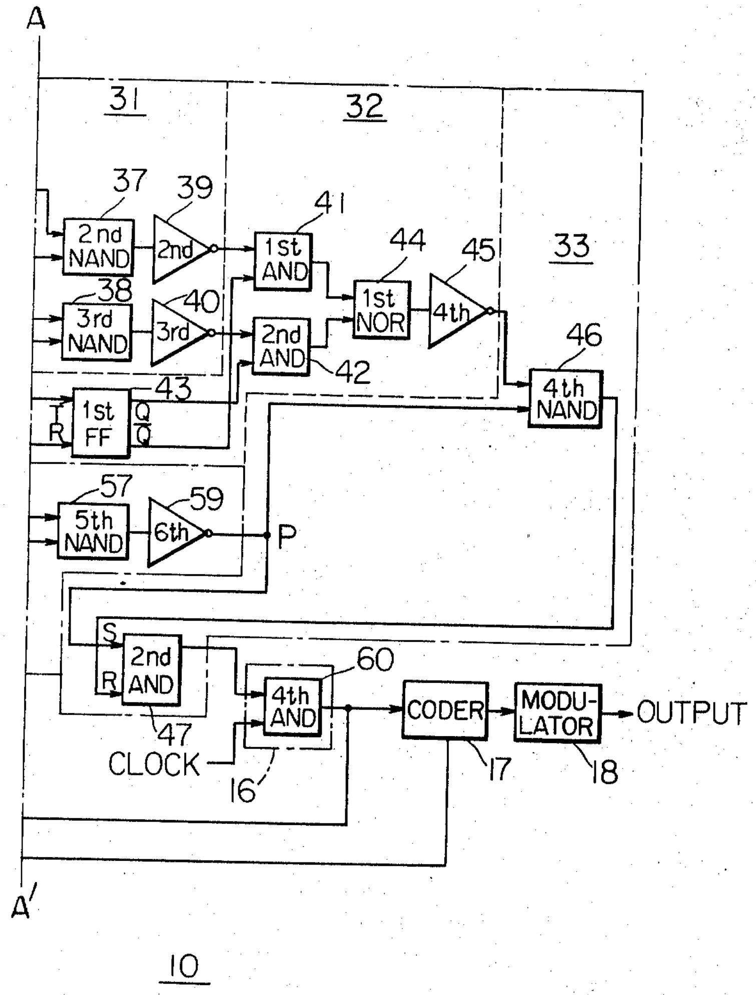
| Fig. 1-a | Fig. 1-b |
| --- | --- |

Fig. 6-a
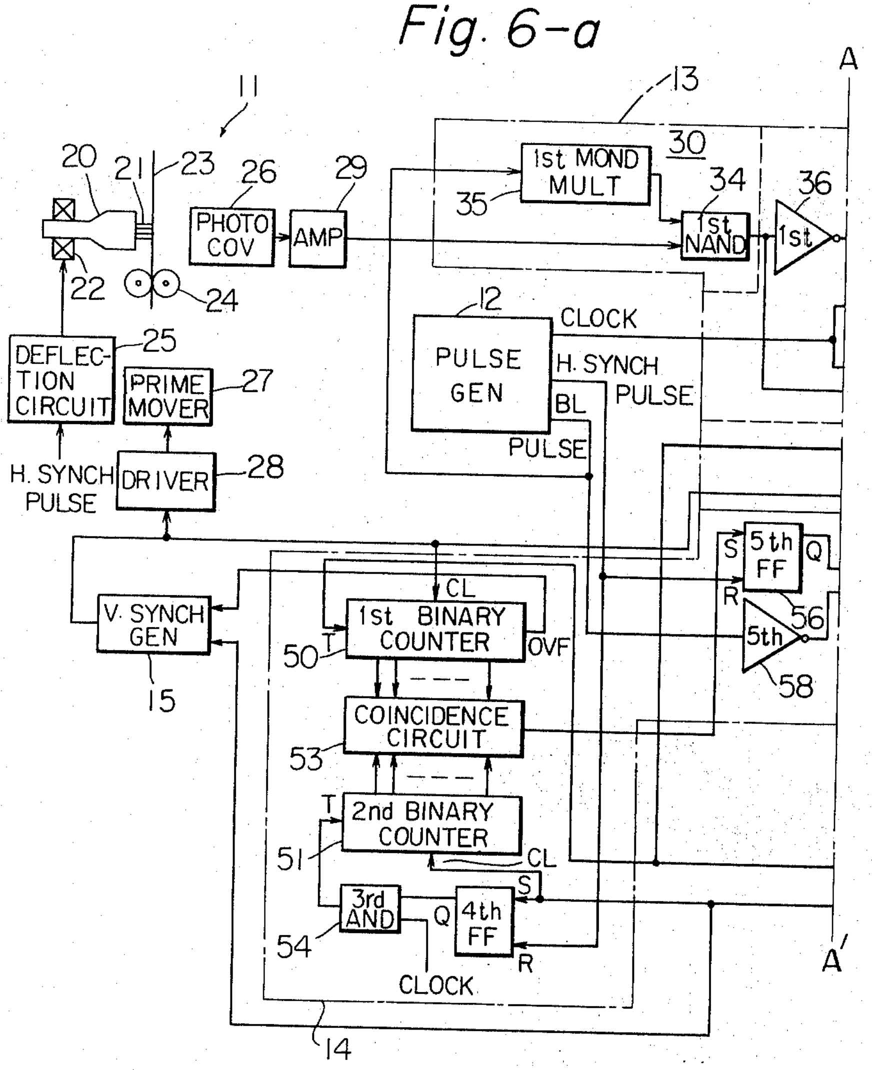
| Fig. 6-a | Fig. 6-b |
|---|---|

Fig. 6-b
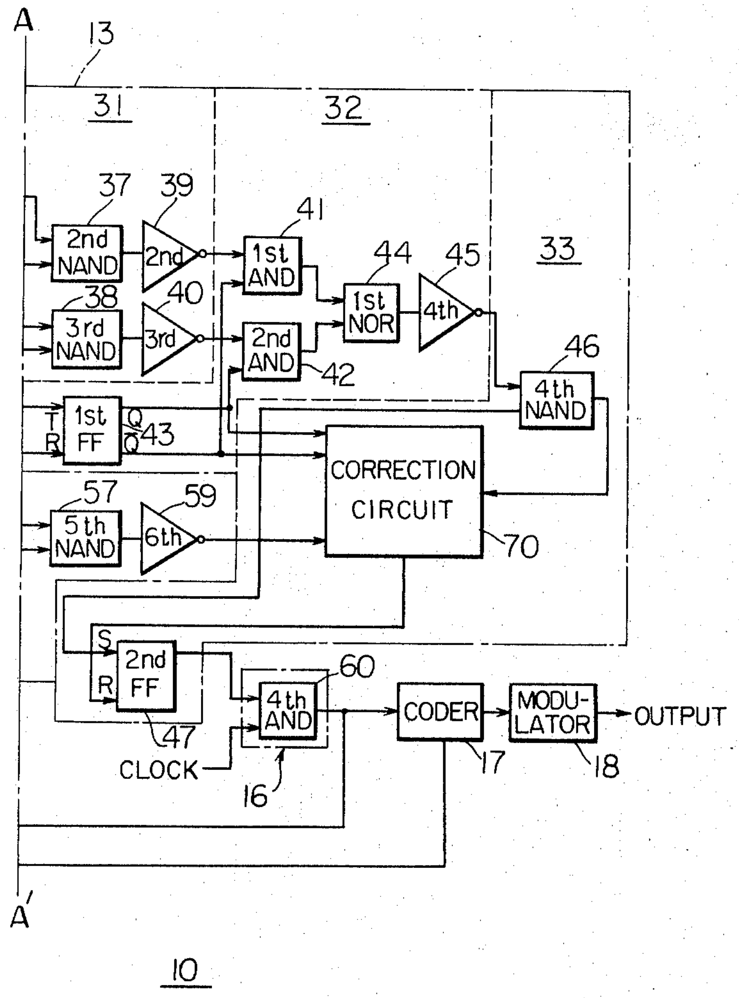
| Fig. 6-a | Fig. 6-b |
|---|---|

PHOTOGRAPHIC IMAGE PICK-UP CODING SYSTEM

The present invention relates to photographic image pick-up and transmission systems and more particularly to a photographic image pick-up and coding system of run-length type.

It has been a problem in conventional image pick-up and transmission systems to minimize the transmission interval of an image signal so as to efficiently utilize the number of transmission channels.

Various signal processing methods for reducing the transmission interval of an image signal are known in the art, one of which is *frequency band width compression method*. This method includes converting an image signal to be transmitted into multiple digit signal, in this invention a binary digit signal, thereby to narrow the width of the frequency spectrum of the signal to be transmitted. Although this method has been recently improved in order to employ for data transmission and facsimile, the method is not fully acceptable.

Another method is a *time axis compression* method which includes converting an image signal into a code signal of short time. This method is capable of reducing the transmission interval better than the frequency band width compression method by removing the redundancy proper to the image signal. However, a system employing this method necessitates a memory of large capacity and is inevitably complicated in construction and costly.

More recently, improved image signal pick-up and transmission systems have been developed which employ the run-length pick-up method. These systems are still not fully acceptable.

It is accordingly a principal object of the present invention to provide an improved run-length image pick-up and transmission system.

It is another object of the invention to provide a run-length image pick-up and transmission system which can correctly operate in spite of unwanted external disturbances or voltage fluctuation of the electric power to be applied to the system.

These and other objects and the attendant advantages of the invention will become more readily appreciated as the same become better understood by reference to the following detailed description when taken in conjunction with the accompanying drawings in which:

FIG. 1, consisting of FIGS. 1A and 1B, is a schematic block diagram of a photographic image pick-up and transmission system of the present invention.

FIGS. 2A through 2J are waveforms appearing in the system of FIG. 1.

FIG. 6 is a schematic block diagram of another system of the invention.

FIG. 8A through 8M are waveforms of signals appearing in the system of FIG. 6.

Figures 2A, 2B, 2C, 2D, 2E, 2F, 2G, 2H, 2J:
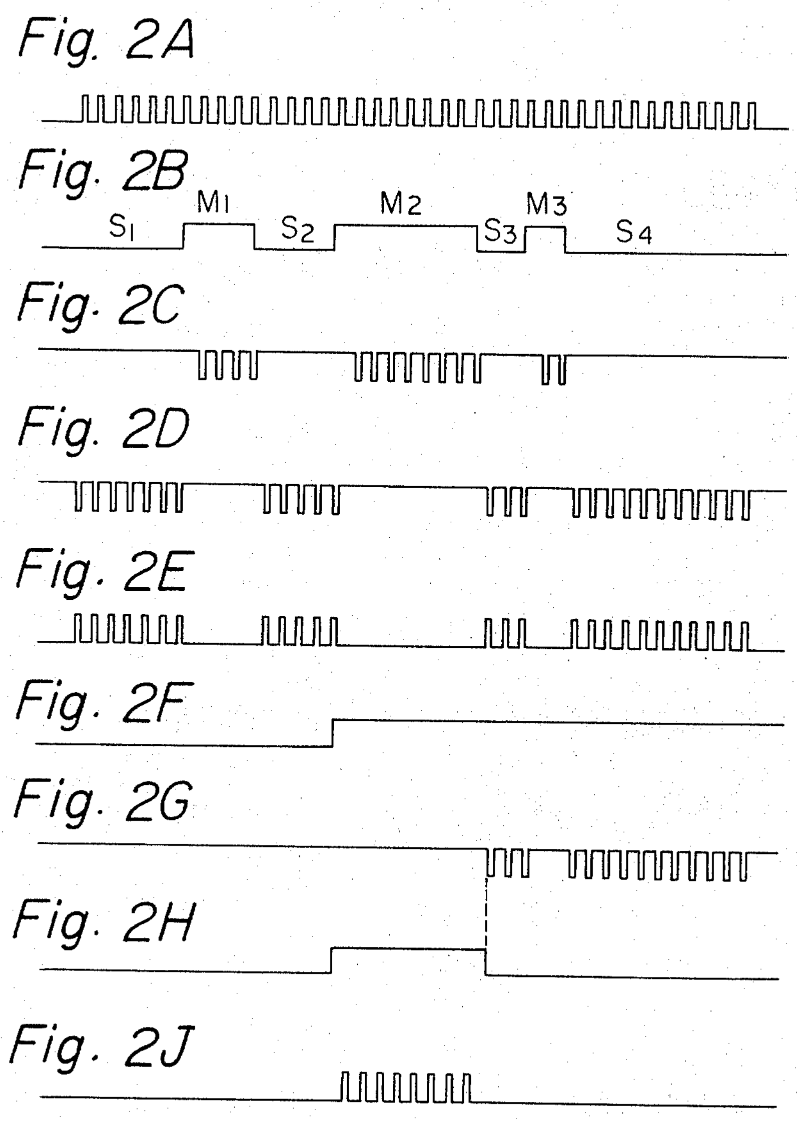

Referring now to the drawings and more specifically to FIG. 1, there is shown an image pick-up and transmission system 10 according to the invention which generally comprises a facsimile signal generator 11, a pulse signal generator 12 for producing clock pulse, horizontal synchronizing pulse and horizontal blanking pulse signals, a run-length gate controller 13, a start signal generator 14, a vertical synchronizing pulse generator 15, a run-length gate 16, a coder 17, and a modulator 18. The facsimile signal generator 11 includes a flying-spot tube 20 having a fiber optics faceplate 21 and a deflection coil 22. A recording medium 23 carrying photographic image information is advanced in close proximity to the front end of the faceplate 21 by means of a feeding means 24 such as a pair of rollers. The flying-spot tube 20 produces at the faceplate 21 a flying-spot, or a moving light spot, which sweeps in one direction in synchronism with the horizontal pulse signal applied from the pulse generator 12 to a deflection circuit 25 connected to the deflection coil 22. The flying-spot scans the recording medium 23 with the result that the intensity of the flying-spot is modulated by the photographic image information on the recording medium 23. The modulated flying-spot is picked up and converted into an electric signal or a facsimile signal by a photo-electric converter 26 positioned in the vicinity of the faceplate 21. The feeding means 24 is, on the other hand, intermittently driven by a prime mover 27 so that the recording medium 23 is advanced in a vertical direction perpendicular to the scanning direction of the flying-spot, whereby the recording medium 23 is consecutively scanned by the flying-spot and the image information is desiredly pick up. The prime mover 27 is controlled by a driver 28 which receives a vertical synchronizing pulse signal from the vertical synchronizing pulse generator 15. The facsimile signal from the converter 26 is amplified by the amplifier 29.

The run-length gate controller 13 generally includes a space signal superposer 30 for superposing a space signal at the leading portion of the facsimile signal delivered from the facsimile signal generator 11, a sampler 31 for sampling the facsimile signal with the clock pulses, a mark-space selector 32 for selectively passing therethrough one of the sampled mark and space signals, a run-length gate pulse generator 33 for producing run-length gate pulses in accordance with the one of the sampled mark and space signals passed through the selector 32 and the start signal from the start signal generator 14. The space signal superposer 30 includes a first NAND gate 34 having one input connected to the output of the amplifier 29. The other input of the NAND gate 34 is connected to an output of a monostable multivibrator 35 which switches to a quasi-stable state for a certain time period when triggered by a blanking pulse signal from the pulse generator 12. The sampler 31 includes a first inverter 36 having an input connected to an output of the first NAND gate 34. An output of the inverter 36 is connected to one input of a second NAND gate 37. The output of the first NAND gate 34 is also connected to one input of a third NAND gate 38. The other input of both the NAND gates 37 and 38 are connected to a clock pulse terminal of the pulse generator 12. Outputs of the NAND gates 37 and 38 are respectively connected to inputs of a second and third inverters 39 and 40. The mark-space selector 32 includes first and second AND gates 41 and 42. The first AND gate 41 has one input connected to an output of the inverter 39 and the other input connected to a $\overline{Q}$ terminal of a first flip-flop circuit 43. The second AND gate 42 has one input connected to an output of the third inverter 40 and the other input connected to a Q terminal of the flip-flop circuit 43. The first flip-flop circuit 43 is triggered by a coding completion signal from the coder 17 and reset by the vertical synchronizing pulse from the generator 15. Outputs of the first and second AND gates 41 and 42 are connected to both inputs of a NOR gate 44 which has an output connected to an input of a fourth inverter 45. The run-length gate pulse generator 33 includes a NAND gate 46 and a second flip-flop circuit 47. The NAND gate 46 has one input connected to an output of the inverter 45 and an output connected to the reset terminal of the flip-flop circuit 47. The other input of the NAND gate 46 and the set terminal of the flip-flop circuit 47 are connected to the output of the start pulse genrator 14, at point P.

The start pulse generator 14 includes first and second binary counters 50 and 51. The first binary counter 50 has a trigger terminal connected to the output of the run-length gate 16 and a clear terminal connected to the output of the vertical synchronizing pulse generator 15, an overflow terminal connected to one input of the pulse generator 15, and a number of digit output terminals connected to one side input terminals of a coincidence circuit 53. The second binary counter 51 has a trigger terminal connected to an output of a third AND gate 54, a clear terminal connected to the code completion signal terminal of the coder 17 and a number of diget output terminals connected to the other side input terminals of the coincidence circuit 53. The third AND gate 54 has one input connected to the block pulse terminal of the pulse generator 12 and the other input connected to the Q terminal of a fourth flip-flop circuit 55. The flip-flop circuit 55 has the set terminal connected to the coding completion signal terminal of the coder 17 and the reset terminal connected to the horizontal synchronizing pulse terminal of the pulse generator 12. An output of the coincidence circuit 53 is connected to the set terminal of a fifth connected to the horizontal synchronizing pulse terminal of the pulse generator 12. The Q terminal of the flip-flop circuit 56 is connected to one input of a fifth NAND gate 57, the other input of which is connected to an output of a fifth inverter 58. The inverter 58 has an input connected to the blanking pulse terminal of the pulse generator 12. An output of the NAND gate 57 is connected to an input of a sixth inverter 59, which has an output at P, serves as the output of the start pulse generator 14.

Although the run-length gate 16 may be a logical gate circuit of any type, the run-length gate 16 is, in this embodiment, a fourth AND gate 60 having one input connected to the clock pulse terminal of the pulse generator 12 and the other input connected to the output terminal of the second flip-flop circuit 47. An output of the fourth AND gate 60 serves as the output terminal of the run-length gate 16. The output terminal of the gate 16 is connected to the coder 17 which produces a code completion signal on the code completion terminal. The output terminal of the coder 17 is connected to the modulator 18 which modulates the coded signal by a carrier signal.

When in operation, the pulse generator 12 produces on the clock pulse signal terminal the clock pulse signal as shown in FIG. 2A. The repetition rate of the clock pulse signal is so selected as to correspond to the desired horizontal size of the picture element of the image information. The facsimile signal generator 11, on the other hand, produces a facsimile signal as shown in FIG. 2B. The facsimile signal consists of space signals $S_1$, $S_2$, $S_3$ and $S_4$, and mark signals $M_1$, $M_2$ and $M_3$. The facsimile signal is applied to one input of the first NAND gate 34. The monostable multivibrator 35 produces a short mark signal at the leading portion of the facsimile signal. The mark signal is coupled by the NAND gate 34 with the facsimile signal whereby the leading portion of facsimile signal is forced to be a space. The facsimile signal is inverted by the NAND gate 34 and applied through the inverter 36 to one input of the NAND gate 37 and directly to the NAND gate 38. The NAND gates 37 and 38 couple the applied facsimile signal with the clock pulse signal so as to sample the facsimile signal with the clock pulse signal, whereby such pulse signals as shown in FIGS. 2C and 2D appear on the outputs of the NAND gates 37 and 38, respectively. The sampled signals are inverted by the inverters 39 and 40, respectively. The flip-flop circuit 43 is triggered by the coding completion signal from the coder 17 and reset by the vertical synchronizing pulse signal, and produces a logical "1" signal on the Q terminal and logical "0" signal on the $\overline{Q}$ terminal when out of the mark signals of the facsimile signal is coded and a logical 0 signal on the Q terminal and a logical 1 signal on the $\overline{Q}$ terminal when one of the space signals is coded. When, in this instance, one of the mark signals is to be coded, only the second AND gate passes therethrough the sampled space signal as shown in FIG. 2E. The sampled space signal is passed through the NOR gate 44 and the inverter 45 and applied to the one input of the fourth NAND gate 46.

The first binary counter 50, on the other hand, counts and stores the number of clock pulses passed through the run-length gate 50 until the counter 50 is cleared by the vertical synchronizing pulse. Namely, the binary counter 50 indicates the trailing point of the last coded mark or space signal on the recording medium 23. The binary counter 50 is overflowed, a 1-H information sampling completion signal (FIG. 3B) appears at the overflow terminal of the counter 50. The capacity of the counter 50 is selected so that the counter is overflowed when the counter 50 counts the number of clock pulses equal to that of the picture elements along one horizontal line. The fourth flip-flop circuit 55 is set by the coding completion signal from the coder 17 to thereby produce a logical 1 signal on the output, which is applied to one input of the AND gate 54. The AND gate then passes threrethrough the clock pulse signal which is applied to the trigger terminal of the second binary counter 51. The counter 51 then counts the number of the clock pulses until the fourth flip-flop circuit 55 is reset by the horizontal pulse. When the number of the clock pulses counted by the second binary counter 51 coincide with that of the first binary counter 50, the coincidence circuit 53 produces a logical 1 signal, that is a coincidence signal, which is applied to the set terminal of the fifth flip-flop circuit 56, which then produces a logical 1 signal which is applied to the fifth NAND gate 57. As long as the horizontal blanking pulse does not appear, the NAND gate 57 produces a logical 0 signal which is inverted by the inverter 59 into a logical 1 signal, that is the start signal, as shown in FIG. 2F. The start signal is applied to the set terminal of the flip-flop circuit 47 and to the other input of the NAND gate 46. Therefore, on the output of the NAND gate 46 appears a signal as shown in FIG. 2G, the leading edge of the first of which signal resets the flip-flop circuit 47. The flip-flop circuit 47 then produces a run-length gate control pulse as shown in FIG. 2H. The run-length gate control pulse is applied to one input of the AND gate 60, which then passes therethrough during the pulse width of the run-length gate control pulse the clock pulses as shown in FIG. 2J. Namely, the mark signal $M_2$ is sampled with the clock pulses. The sampled signal from the AND gate 60 is coded by the coder 17 and then modulated by the modulator 18.

Referring now to FIGS. 3A, 3B, 4A, 4B and 4C, the operation of the system of FIG. 1 is further explained hereinbelow.

Figure 3A:
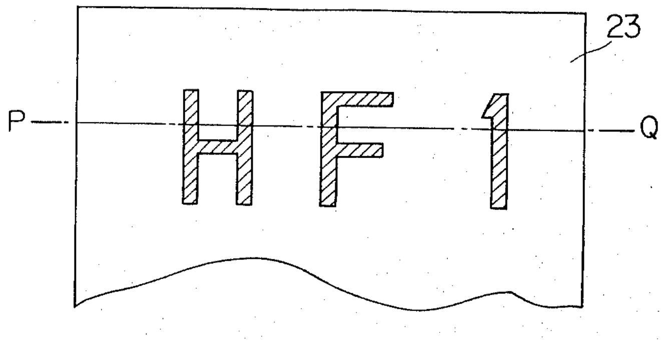
FIG. 3A is a diagram showing an example of recording medium carrying thereon photographic image information to be picked up.
Figure 3B:
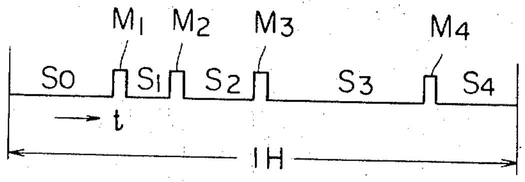
FIG. 3B is a waveform of a facsimile signal representing the image information carried by the recording medium shown in FIG. 3A.
Figures 4A, 4B, 4C:
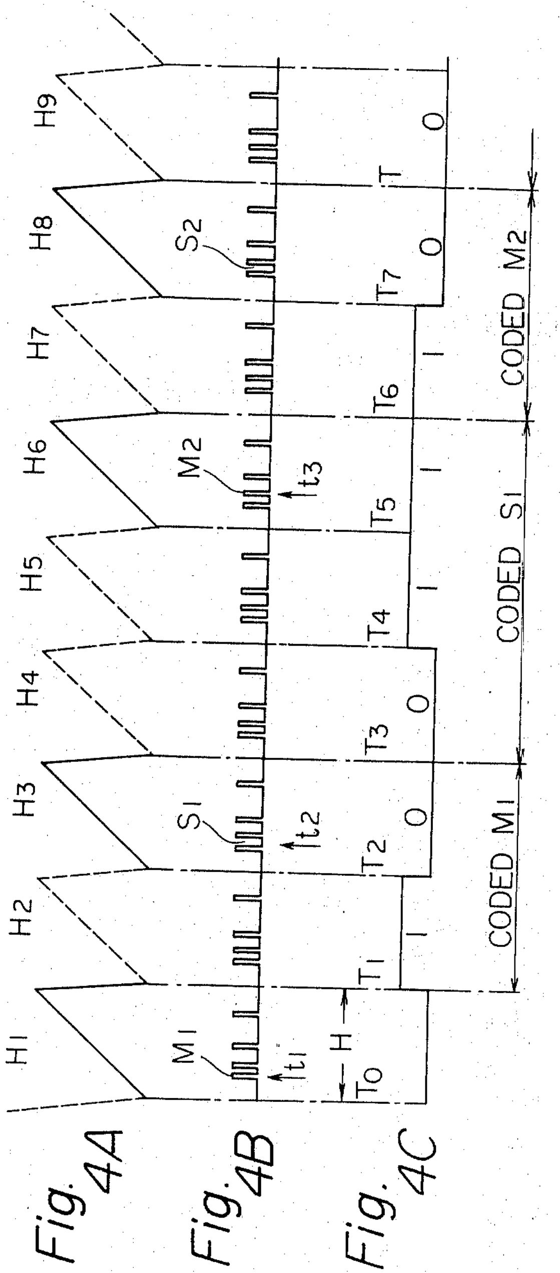
FIGS. 4A through 4C are waveforms appearing in the system of FIG. 1 when the recording medium shown in FIG. 3A is employed in the system.

When, for example, the recording medium 23 carries such photographic information as shown in FIG. 3A, the fassimile signal from the generator 11 has a waveform as shown in FIG. 3B. The deflection coil of the flying-spot tube is energized by the deflection signal as shown in FIG. 4A, so that the facsimile signal shown in FIG. 3B repeatedly appears as shown in FIG. 4B. When, for example, the mark signal $M_1$ is to be coded, the mark signal $M_1$ is sampled with the clock pulses by the run-length gate 16. The sampled mark signal $M_1$ is applied to the coder 17 which then produces coded signal $M_1$ from a time $T_1$ to another time $T_3$ in FIG. 4C. The coder is adapted to produce the coding completion signal at a time $T_2$ one digit before the time when the coding is finished. The coder 17 therefore receives the sampled succeeding space signal $S_1$ from the run-length gate 16 during the time interval from the time $T_2$ to $T_3$. The coder 17 produces the coded $S_1$ signal from the time $T_3$ to $T_6$. When the coding of the space signal $S_4$ is completed, the coder 17 produces the coding completion signal. At the same time, the first binary counter 50 produces the 1–H information sampling completion signal on the overflow terminal thereof. The coding completion signal and the 1–H information sampling completion signal are delivered to the vertical synchronizing pulse generator 15 which then produces the vertical synchronizing pulse signal on the output thereof. The vertical synchronizing pulse signal energizes the driver 28 which accordingly energizes the prime mover 27. The energized prime mover 27 actuates the feeding means 24 which then feeds the recording medium by a predetermined length corresponding to the vertical length of one picture element of the information on the recording medium 23. Thereupon, the overall system repeats the same operation as abovementioned so as to pick up another part of the image information lying on the succeeding horizontal line.

Since the inventive system repeatedly scans the recording medium with the flying-spot along the same horizontal scanning line pending the completion of coding image information on the horizontal scanning line, the inventive system is simple in construction and does not require costly memory means.

It is a problem that the above-stated system is liable to erroneously operate due to unwanted external disturbances, as mentioned hereinbelow.

Figure 5A:
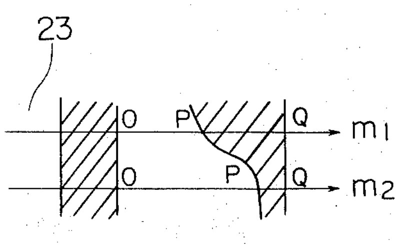
FIG. 5A is a diagram showing deviation of scanning lines on the recording medium.
Figure 5B:
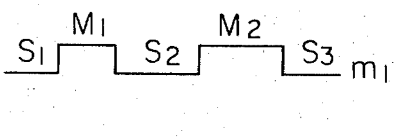
FIG. 5B is a waveform of a facsimile signal when the recording medium is scanned along the scanning line $m_1$.
Figure 5C:
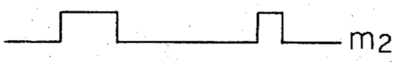
FIG. 5C is a waveform of a facsimile signal when the recording medium is scanned along the scanning line $m_2$ in FIG. 5A.
Figure 5D:
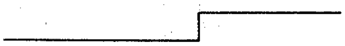
FIGS. 5D and 5E are waveforms of signals appearing in the system of FIG. 1 when the facsimile signals of FIGS. 5B and 5C are consecutively produced in the system of FIG. 1.
Figure 5E:

FIG. 5A shows a portion of a recording medium on which graphic image information as indicated by hatchings. When, for example, the recording medium is firstly scanned with the flying-spot along a scanning line $m_1$, a facsimile signal having a waveform as shown in FIG. 5B is produced by the facsimile signal generator 11. If the succeeding scanning is performed along another scanning line $m_2$ due to external disturbances such as fluctuation of the voltage electric power source, then the facsimile signal has a waveform as shown in FIG. 5C. Since, in this instance, the start signal from the start signal generator 14 rise up as shown in FIG. 5D, the run-length gate control signal has a waveform as shown in FIG. 5E. In this case, the system apparently erroneously operates.

In order to solve the above-stated problem encountered in the system of FIG. 1, an improved image pick-up and transmission system is provided according to the invention, which is shown in FIG. 6. The particular system comprises the same construction as that of FIG. 1 except that the run-length gate controller 13 further comprises a correction circuit 70 interposed between the fourth NAND gate 46 and the second flip-flop circuit 47.

Figure 7:
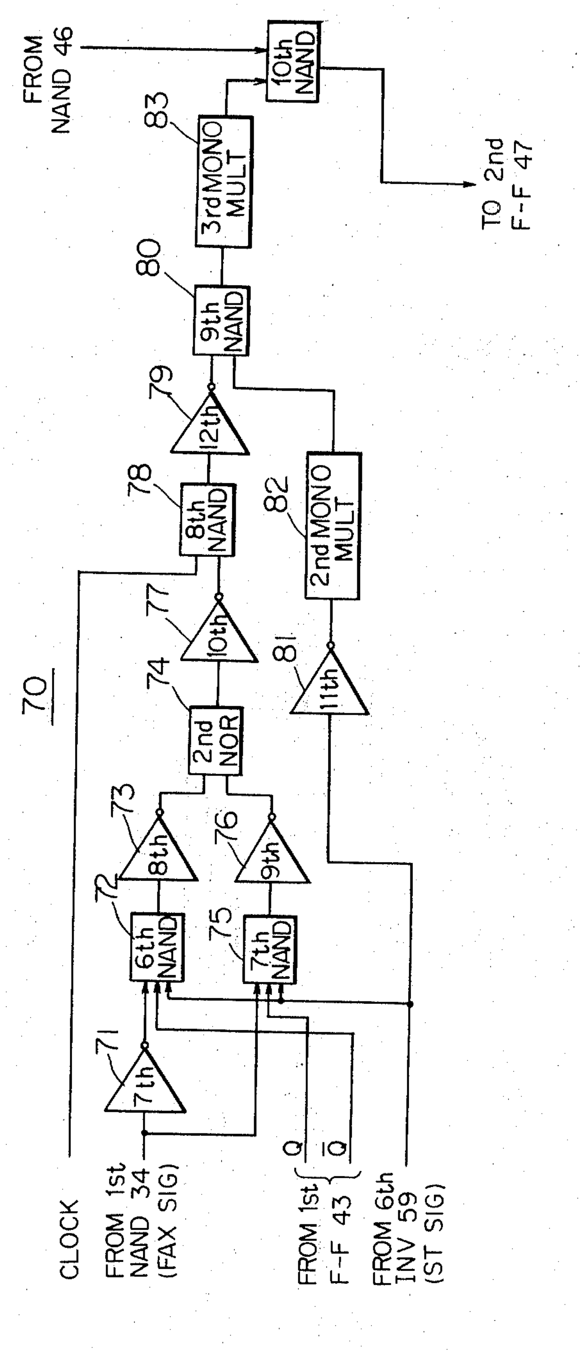
FIG. 7 is a block diagram of a portion of the system of FIG. 6.

In FIG. 7, the correction circuit is illustrated in detail; it includes a seventh inverter 71 having an input connected to the output of the first NAND gate 34 and an output connected to a first input of a sixth NAND gate 72. An output of the sixth NAND gate 72 is connected through an eighth inverter 73 to one input of a second NOR gate 74. To the output of the first NAND gate 34 is further connected a first input of a seventh NAND gate 75 having an output connected through a inverter 76 to the other input of the second NOR gate 74. Second inputs of the sixth and seventh NAND gates 72 and 75 are connected to the Q and $\overline{Q}$ terminals of the first flip-flop circuit 43, respectively. Third inputs of the NAND gates 72 and 75 are connected to the output of the sixth inverter 59. Output of the second NOR gate 74 is connected through a tenth inverter 77 to one input of a eighth NAND gate 78. With the above-stated arrangement, one of the mark and space signals of the facsimile signal is applied to the one input of the NAND gate 78 in accordance with the signal from the flip-flop circuit 43 when the start signal arises. The other input of the NAND gate 78 is connected to the clock pulse terminal of the pulse generator 12. The mark or space signal applied to the NAND gate 78 is then sampled with the clock pulses by the NAND gate 78. The sampled signal is inverted by the twelfth inverter 79 and applied to one input of a ninth NAND gate 80. The start signal from the inverter 59 is, on the other hand, applied through the inverter 81 to a second monostable multivibrator 82 which then produces a gate pulse signal lasting from the rise up of the start signal for a predetermined duration. The gate pulse signal is applied to the other input of the NAND gate 80 which then passes therethrough the sampled signal.

The sampled signal is delivered to the third monostable multivibrator 83 which is triggered to produce an error eliminating pulse signal. The error eliminating pulse signal is applied to one input of a tenth NAND gate 84 the other input of which is connected to the output of the NAND gate 46. Output of the NAND gate 84 is connected to the reset terminal of the second flip-flop circuit 47.

Referring to FIGS. 8A through 8L, the operation of the correction circuit 70 of FIG. 7 is explained hereinbelow.

Figures 8A, 8B, 8C, 8D, 8E, 8F, 8G, 8H, 8J, 8K, 8L, 8M:
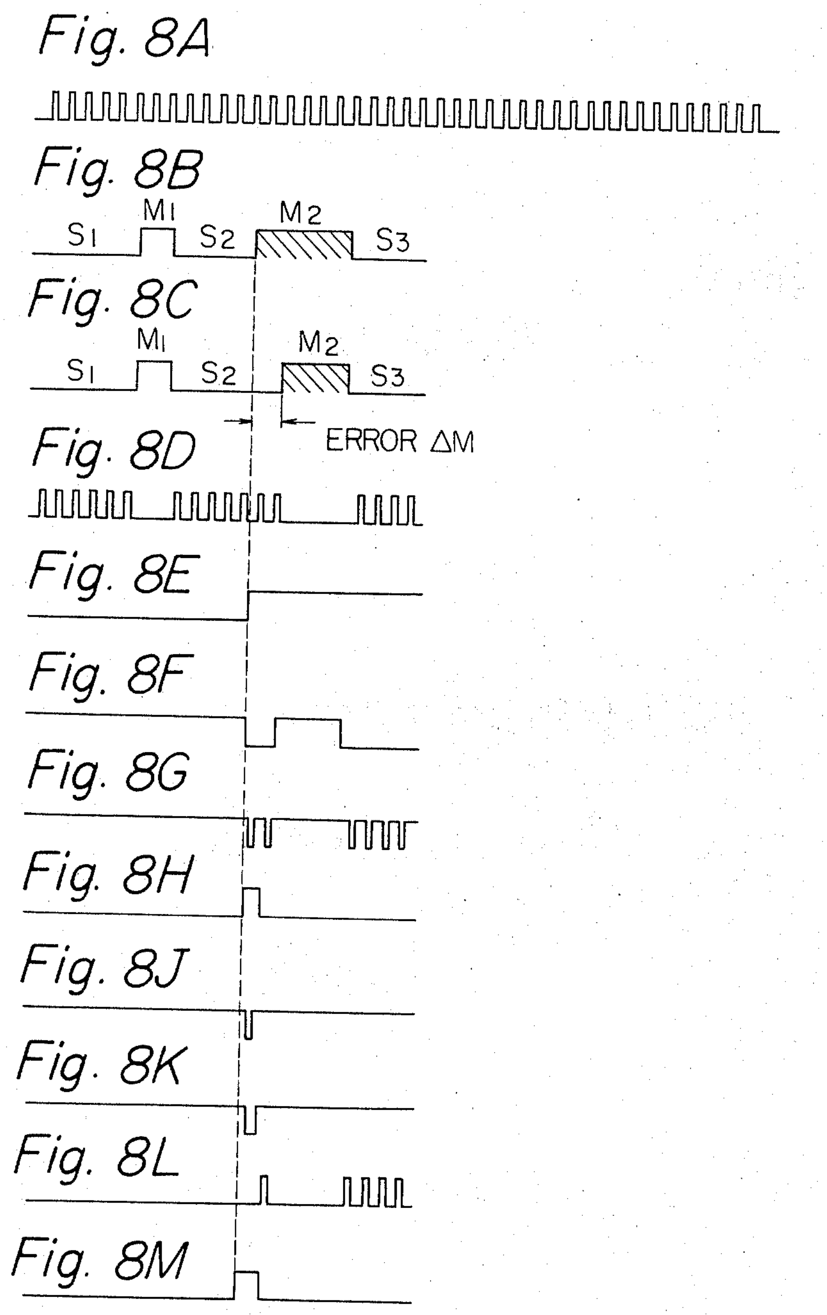

The clock pulses as shown in FIG. 8A are applied to the NAND gate 78. It is in this instance assumed that the former facsimile signal has a waveform as shown in FIG. 8B and the succeeding facsimile signal has a waveform as shown in FIG. 8C. When the mark signal $M_2$ is to be coded, the sampled signal appearing at the output of the NAND gate 46 has a waveform as shown in FIG. 8D and the start signal from the start signal generator 14 has a waveform as shown in FIG. 8E. A signal appearing from the second NOR gate 74 has a waveform as shown in FIG. 8F. Thus, the output signal from eighth NAND gate 78 has a waveform of FIG. 8G. The second monostable multivibrator 82, on the other hand, produces a gate pulse signal having a waveform of FIG. 8H. Since the ninth NAND gate produces a signal having a waveform of FIG. 8J, the third monostable multivibrator 83 produces an error eliminating pulse signal having a waveform of FIG. 8K, which is applied to the other input of the NAND gate 84. Hence, the first pulse of the signal from the NAND gate 46 is blocked by the NAND gate 84 and a pulse signal having a waveform of FIG. 8L appears at the output of the NAND gate 84, which is applied to the second flip-flop circuit 47. The second flip-flop circuit 47 therefore produces a run-length gate pulse having a waveform as shown in FIG. 8M.

Being apparent from the above description, the system of FIG. 6 including the correction circuit 70 regards the error period $\Delta M$ as a mark or space signal of one picture element when the period $\Delta M$ is equal to or larger than two picture elements. When the error period $\Delta M$ is smaller than two picture element, the system of FIG. 6 neglects the error period $\Delta M$. It will be understood that the deviation of the scanning line of the flying-spot is most important when an edge portion of a graphic pattern, character or the like is on the recording medium. In this case, the system of FIG. 6 represents the edge portion by alternate mark and space lines of one picture element length, namely, a broken line.

It should be apparent from the above detailed description that an improved image pick-up and transmission system has been provided. The described system is simple and economical.

It will be understood that the invention is not to be limited to the exact construction shown and described and that various changes and modifications may be made without departing from the spirit and scope of the invention, as defined in the appended claims.

What is claimed is:

1. A photographic image information pick-up and coding system for picking up and coding photographic image information carried on a recording medium, which comprises:

a facsimile signal generator for repeatedly producing facsimile signals each representing a part of said image information lying on a horizontal scanning line, each of said facsimile signals including at least one space signal;

a pulse generator for producing a clock pulse signal consisting of clock pulses consecutively appearing at a constant rate and a blanking pulse signal consisting of blanking pulses appearing during the blanking period between two consecutive facsimile signals;

a run-length gate for passing therethrough said clock pulse signal during a time duration when a run-length gate pulse lasts;

a start signal generator for producing a start signal;

a run-length gate controler for producing said run-length gate pulse in accordance with said facsimile signals, clock pulse signal and blanking pulse signal, said run-length gate controler including a space signal superposer for superposing a mark signal at the leading portion of each of said facsimile signals, a sampling circuit for sampling said mark and space signals with said clock pulse signal, a mark-space selector for selectively passing therethrough one of the sampled mark and space signals, and means for producing said run-length length gate pulse, said run-length gate pulse rising up at the rise up of said start signal and falling down at the rise up of the first pulse of the sampled one signal passed through said mark-space selector;

a coder for coding the passed clock pulses;

first means for selectively passing therethrough one of said mark and space signals when receiving said start signal;

second means for sampling said one of the mark and space signals with said clock pulse signal;

third means for producing a gate pulse lasting from the rise up of said start signal for a predetermined duration;

an error eliminating pulse generator for producing an error eliminating pulse when receiving said one of the sampled mark and space signals from said second means and said gate pulse from said third means; and gate means for blocking said run-length gate pulse when receiving said error eliminating pulse.

* * * * *

UNITED STATES PATENT OFFICE
CERTIFICATE OF CORRECTION

Patent No. 3,825,678 Dated July 23, 1974

Inventor(s) Hiroyoshi Tsuchiya et al

It is certified that error appears in the above-identified patent and that said Letters Patent are hereby corrected as shown below:

In claim 1, line 14, should read "one space or mark signal."

in line 29, the word "mark" should be --space--

Signed and sealed this 8th day of October 1974.

(SEAL)
Attest:

McCOY M. GIBSON JR.
Attesting Officer

C. MARSHALL DANN
Commissioner of Patents